United States Patent [19]
Auer

[11] Patent Number: 5,431,115
[45] Date of Patent: Jul. 11, 1995

[54] HANDHELD FERTILIZER DISPENSER

[76] Inventor: James M. Auer, 2523 Aviation Pkwy., Cape Coral, Fla. 33904

[21] Appl. No.: 133,456

[22] Filed: Oct. 8, 1993

[51] Int. Cl.$^6$ ............................................. A01C 5/02
[52] U.S. Cl. ....................................... 111/92; 111/95; 222/175; 222/470
[58] Field of Search ............... 111/92, 95, 96, 97, 111/106, 7.1; 222/166, 175, 185, 631, 462, 465.1, 469, 470, 471, 555; 47/41.14

[56] References Cited

U.S. PATENT DOCUMENTS

| | | | |
|---|---|---|---|
| 467,074 | 1/1892 | Anderson et al. | 222/175 X |
| 701,316 | 6/1902 | Edwards | 222/470 |
| 1,421,327 | 6/1922 | Waters | 47/41.14 |
| 2,493,599 | 1/1950 | Schroeder | 222/470 |

Primary Examiner—David H. Corbin
Assistant Examiner—Howard N. Shipley
Attorney, Agent, or Firm—Frank A. Lunasik

[57] ABSTRACT

The present invention is a hand-held fertilizer dispenser. The dispenser is tapered in shape, tapering into a small side discharge opening to place the fertilizer exactly where desired. A pivoted handle is provided at the top which allows it to be carried at arm's length to avoid contact with chemicals. A spring loaded trigger pulls a plate upwardly to open a side discharge opening. A retractable spike is used to hold the hopper in a vertical position while loading with fertilizer.

2 Claims, 4 Drawing Sheets

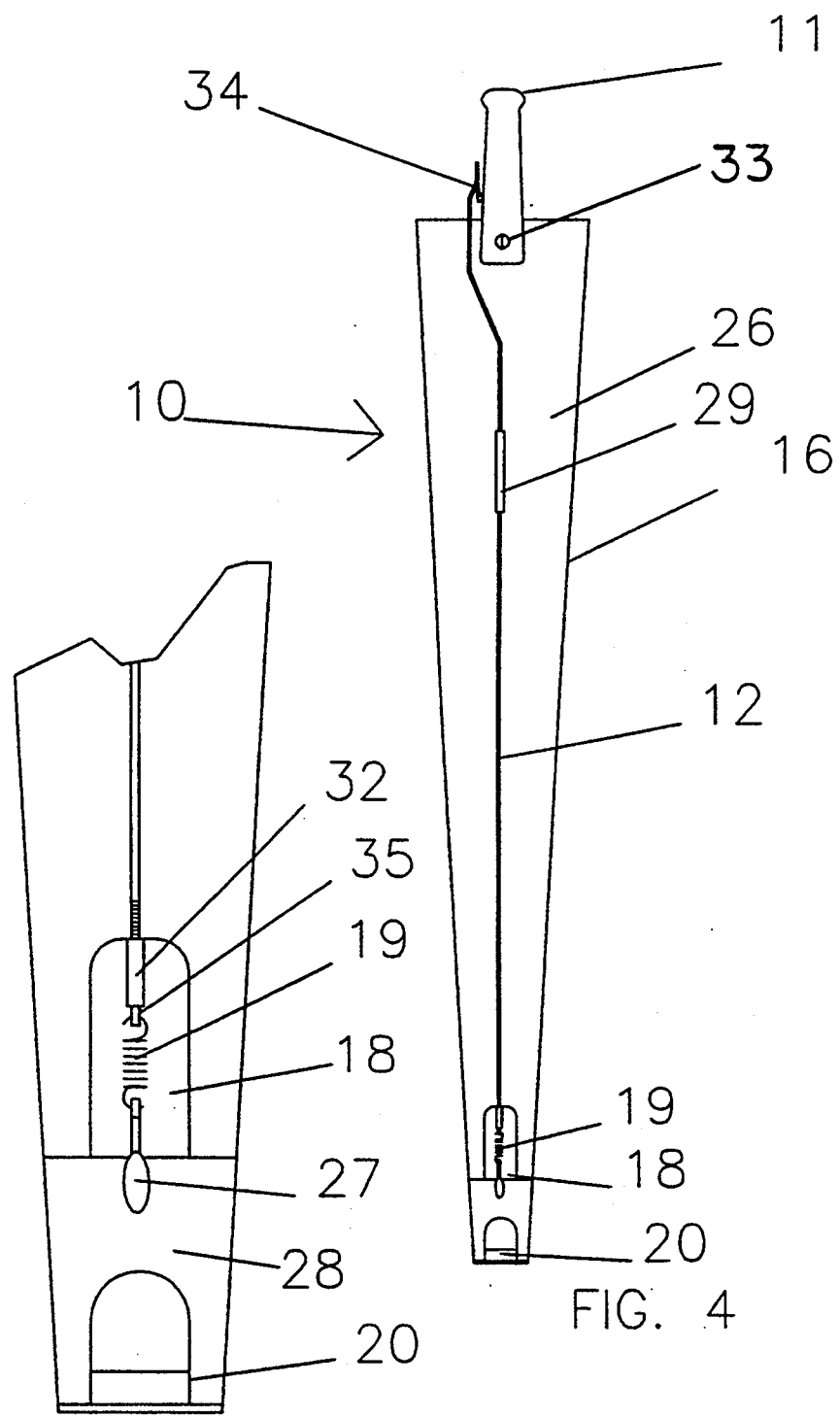

HANDHELD FERTILIZER DISPENSER

BACKGROUND OF THE INVENTION

1. Field of the invention

This invention relates generally to an apparatus for dispensing fertilizer in an optimum position for maximum plant fertilization while protecting the fragile foliage from the adverse effects of fertilizer. More particularly, the invention relates to a device for dispensing a controlled amount of fertilizer on the soil near a plant root system in an efficient and simple manner.

2. Discussion of the prior art

The prior art discloses several devices which deliver fertilizer to plant root systems. U.S. Pat. No. 3,468,457 to Martin discloses a dispensing apparatus for dispensing granular fertilizer comprising a hopper having a controlled outlet leading to a chute. The material flowing from the outlet of the chute is subjected to a sensing device which controls the operation of a wiper at the outlet of the hopper to prevent clogging of the latter outlet.

U.S. Pat. No. 3,566,812 to Barnes discloses a dispensing apparatus for dispensing anhydrous nitrogenous fertilizers containing anhydrous liquid ammonia and a normally solid compound soluble in ammonium nitrate which comprises a pressure pack provided with a valve. On releasing the valve of the pressure pack the liquid fertilizer will dispense itself for as long as the valve is open.

U.S. Pat. No. 4,286,737 to Gallant discloses a dispenser having a nipple at the lower end to which a hose can be connected and the nipple has a cylindrical opening with a valve seat in its lower end. A valve extends into the nipple and the valve has a rod on it that extends out the top of the tank and a handle on the upper end of the rod can be grasped by a person holding the tank by its handle to move the valve to open position to dispense the fertilizer. The rods extend upwardly from the nipple to guide the valve into engagement with the valve seat.

U.S. Pat. No. 4,290,374 to Maples, discloses a handheld and operated seeder apparatus which carries and spreads seed to selected lawn areas. Spreading is accomplished by securing the lower end of a storage handle to a cup member. When the apparatus is moved up and down, seed in the handle flows from the handle to the cup and the seed is then jostled to and over the top of the cup. The seed falls onto localized areas of the ground.

U.S. Pat. No. 5,170,729 to Benner discloses a fertilizer dispenser with a closure at a pointed tip. The device consists of an inner and outer tubular section with the inner tube being hollow. Both tubular sections have a lower pointed end and the inner tube is rotatably disposed within the outer tube. A funnel is provided on the inner tube as well as a handle which actuates the rotation of the inner tube. Another handle is provided on the outer tube. When the handles are in alignment, the openings are not in alignment. When the inner handle is rotated, the openings are in alignment and the fertilizer is dispensed.

Other prior art devices are constructed with conical or tapered ends which allow for the forced insertion of the device. Openings at the end of one such device may actually clog and obstruct the openings thus restricting the flow through the openings. Some devices are also designed for a one-plant use, remaining as a permanent feeder/waterer for one particular bush, tree, or area. In general, prior art devices which are employed underground are difficult to insert, subject to blockage, or are designed for use about one plant. Many of these devices are complex and difficult to manufacturer and employ.

None of the above patents, taken either singly or in combination, is seen to describe the present invention as claimed.

The manner in which the present invention overcomes the disadvantages of the prior art to produce a novel apparatus will be understood as the description proceeds.

BRIEF DESCRIPTION OF THE DRAWINGS

FIG. 4 is a view of a first side showing the trigger handle and slide door according to the invention.

FIG. 5 is an expanded fragmentary view of a lower section of a first side according to the invention.

DETAILED DESCRIPTION OF A PREFERRED EMBODIMENT

Figure 1:
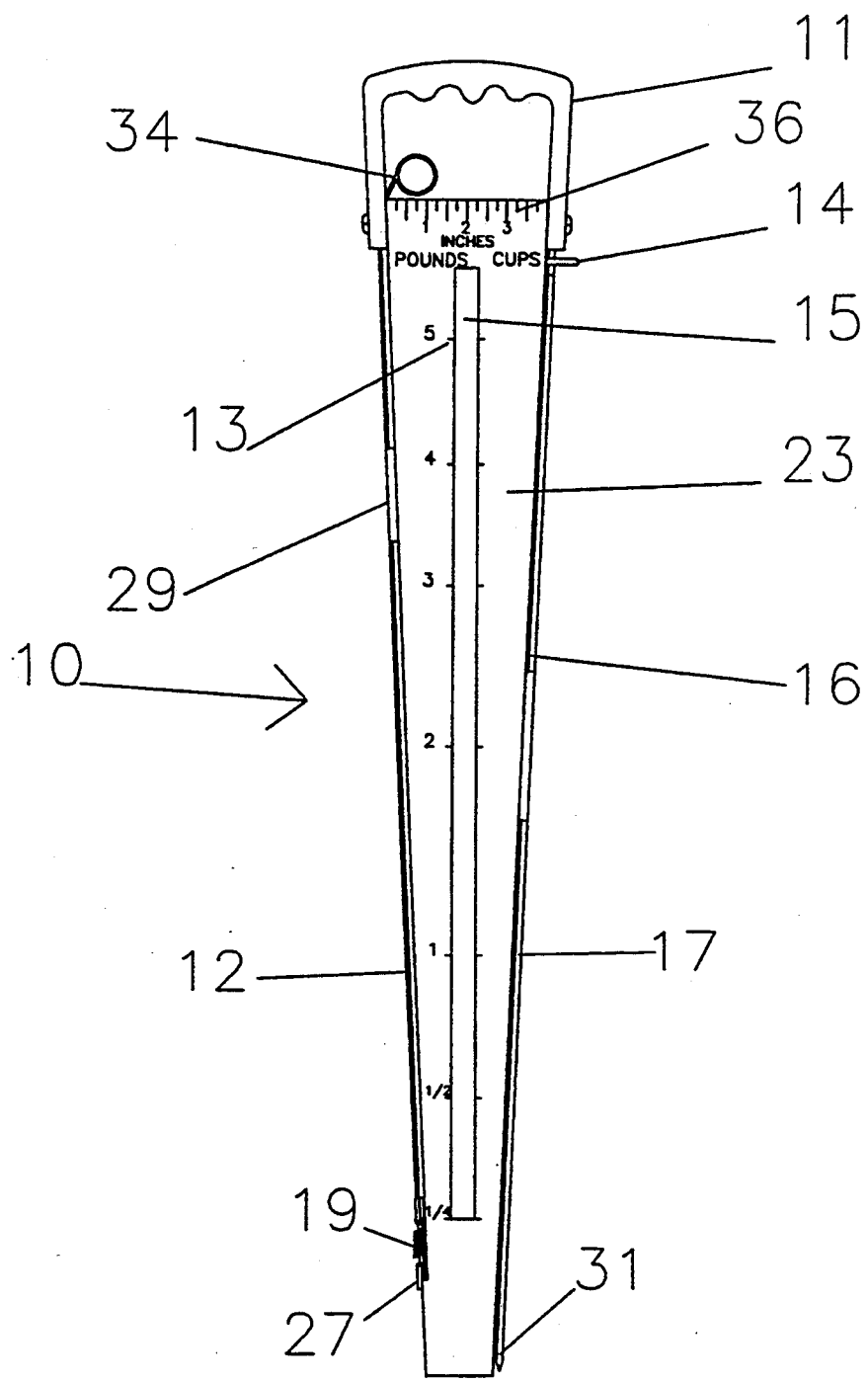
FIG. 1 is a front view of the dispenser according to the invention.
Figures 2, 3:
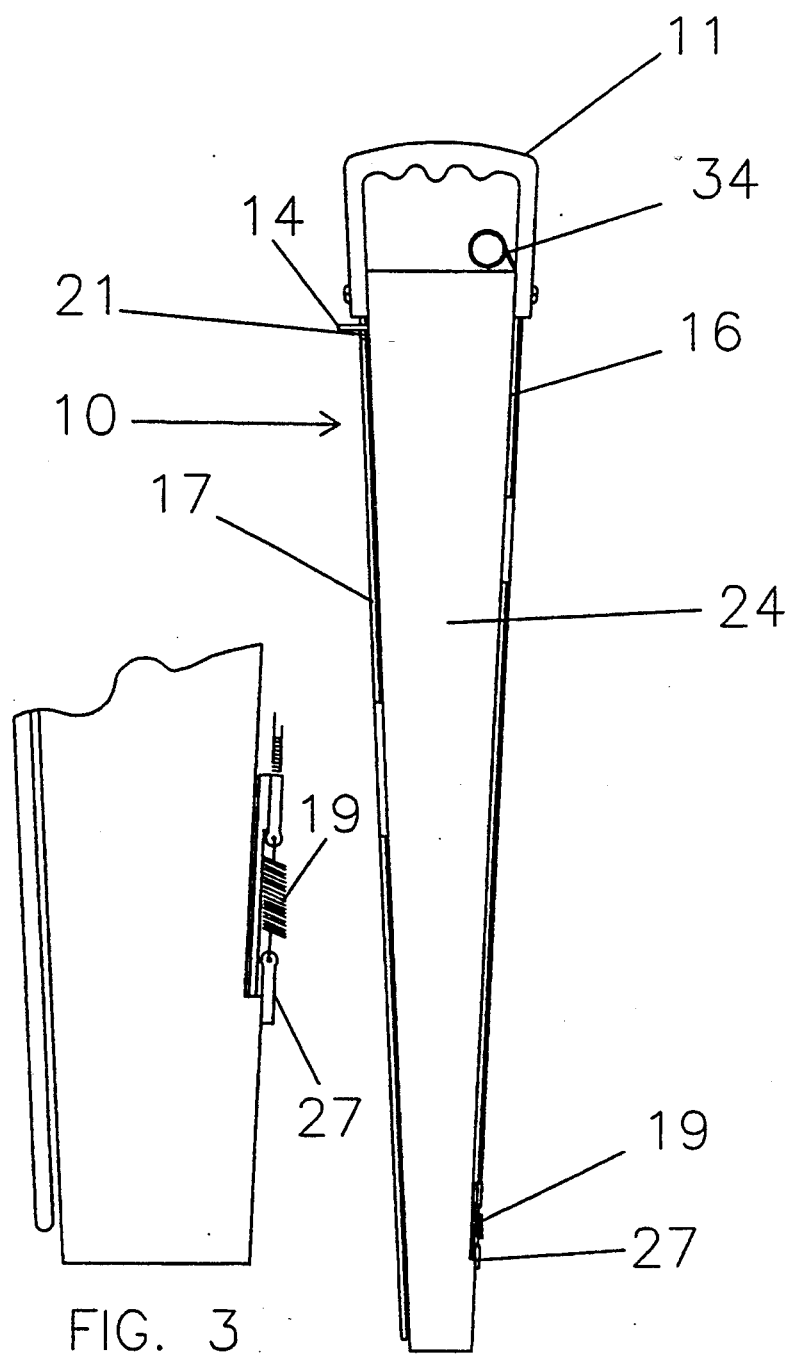
FIG. 2 is a back view of the dispenser according to the invention.
FIG. 3 is an expanded fragmentary view of a lower section of a back end of the present invention.

Referring more in detail to the drawings, the dispensing apparatus 10 which includes a handle 11, a spring loaded trigger 12, measuring gauge 13, locking hook 14, measuring window 15, hopper 16, retractable leg spike 17, opening plate 18, spring 19, controlled outlet 20, and locking holes 22. The hopper 16, comprises front wall 23, back wall 24, first side 25, and second side 26.

The hopper 16 may be made from several different materials such as wood, plastic, either by mold injection or blown mold or other suitable material. In a preferred embodiment, the hopper 16 was made from an injection molded plastic, which was transparent with a green colored tint. The window 15, and gauge 13, provide an accurate representation of the amount of fertilizer remaining in the hopper 16 and the amount of fertilizer dispensed in each application. A four inch scale is provided on the top edge of the hopper 16, which is used to measure the diameter of the tree or shrub to be fertilized. A convenient chart, describing the amount of fertilizer to use for a particular size tree or plant, is included on the back wall 24.

In a preferred embodiment, the hopper was constructed with the top opening width at $3\frac{1}{2}''$, depth 4" and the length 24". The dimensions at the bottom have the end width $1\frac{1}{2}''$, and the depth $1\frac{1}{2}''$. The tapered shape of the hopper 16 provides a wide opening at the top to provide a wide opening for ease of loading the hopper 16 for dispensing the fertilizer. Controlled outlet 20 is sufficiently large to permit small lumps which tend to clog or partially clog the outlet 20 from the hopper 16, to those impeding the constancy of quantity flow from the hopper 16. The opening plate 18 is counterbalanced by the spring 19 which is fastened to front plate 28 at point 27.

Figure 6:
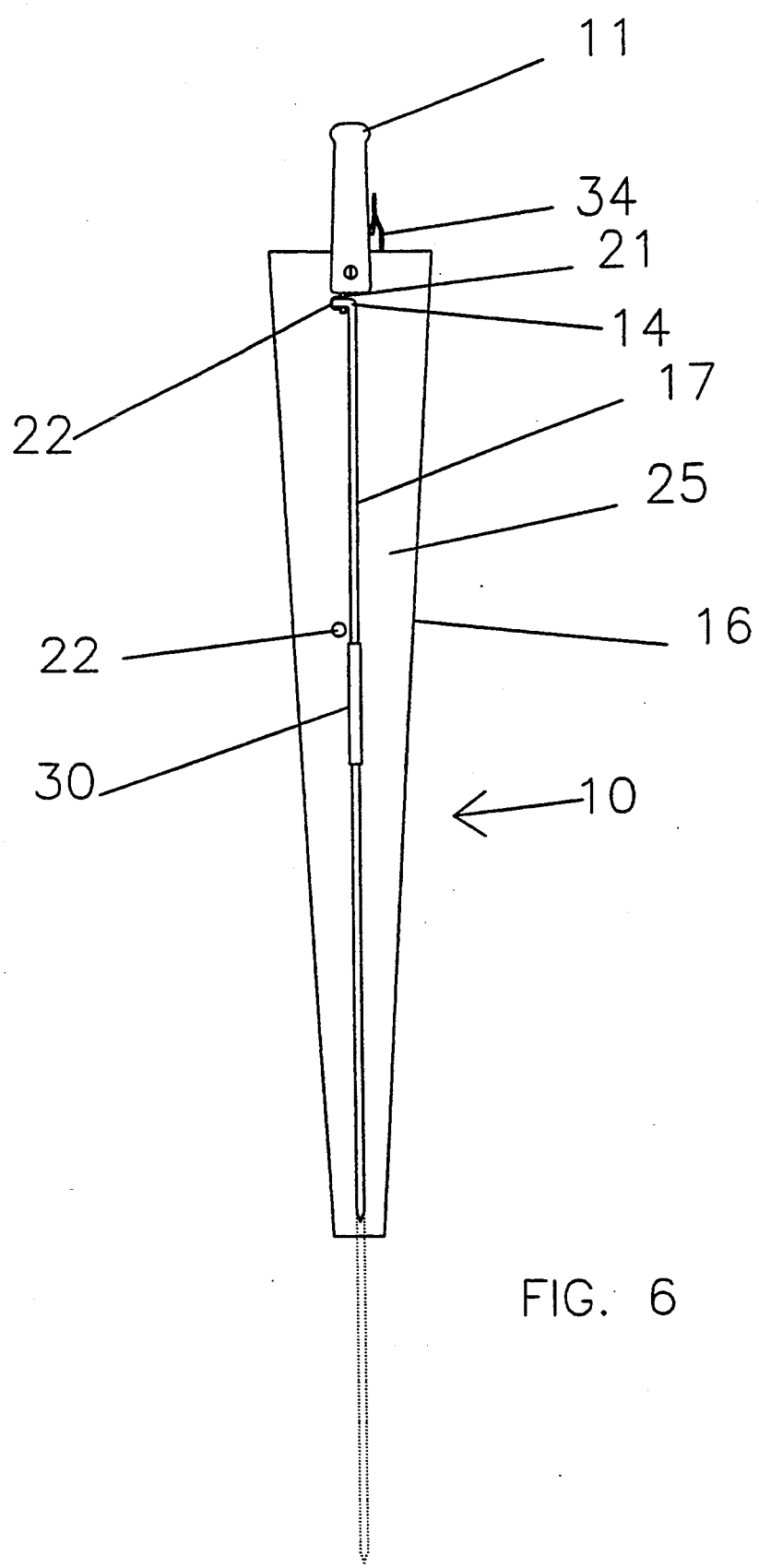
FIG. 6 is a view of a second side of the dispenser showing a retractable leg spike according to the invention.

Retractable leg spike 17 consists of a metal or plastic rod slidably fastened to hopper 16 with leg spike guide 30. Leg spike 17 is formed with a pointed end 31 and a "U" shaped hook end 14 formed at 90° to its axis at its opposite end. FIG. 6 shows leg spike 17 in its stored position with hook end 14 inserted into locking hole 22. When hook end 14 is inserted into locking hole 22, the "U" shape wraps around locking pin 21 which is located in the bottom of handle 11 and thereby holds handle 11 in a vertical operating position.

To fill hopper 16 with fertilizer, an operator grasps dispenser 10 by the handle 11, turns the hook end 14 counter clockwise to release end 14 from upper locking hole 22, slides leg spike 17 downwardly in leg spike guide 30 until spike 17 stops. The "U" shaped hook end 32 is then rotated clockwise until its end is inserted into bottom locking hole 22. Handle 11 is rotated on mounting screws 33 to provide an unimpeded flow path for filling the hopper 16. The spike is then driven into the ground by placing the operator's hands on the top of the hopper 16 and pushing down.

In a preferred embodiment, the hopper 16 could hold up to five pounds of fertilizer as indicated by gauge 13. The operator may cut a small hole in the corner of a fertilizer bag to act as a funnel to pour the fertilizer into the free standing dispenser 10. When filling is completed, the above process is reversed and the dispenser 10 is ready to operate.

Metered discharge is controlled by spring loaded trigger 12 and the flow rate is adjusted by sliding trigger 12 up and down. With the handle gripped by the operator, a finger is inserted into the loop of the trigger 34 and pulled upwardly. The shaft of trigger 12 is slidably fastened to hopper 16 with trigger guide 29. Spring fastener 32 is fitted to the end of trigger 12, on the end opposite to the finger loop 34, and fastened to opening plate 18. Opening plate 18 slides in two slots (not shown) formed in the hopper 16. Using the dispenser 10 of the present invention eliminates the "over" and "under" application of fertilizers. The low, side feed, feature enables the user to direct the nutrients with sufficient accuracy to avoid contact with the leaves, which in many instances will kill the plant. Nothing is wasted, nothing is burned, and nothing is neglected when the present invention is used. Fertilizer is most effective when placed along the drip line areas of the plant.

The dispenser 10 is tapered in shape, tapering smoothly into a small side discharge opening to place the fertilizer exactly where desired. It is made of a durable plastic, which makes it highly resistant to the chemical ingredients employed in such materials. It can be easily flushed and cleaned by simply spraying it with a water hose. A pivoted handle 11 is provided at the top which allows it to be carried at arm's length to avoid contact with the chemicals. It holds up to five pounds of fertilizer, so it is not uncomfortable nor unmanageable. A preferred embodiment was a transparent, green tinted, plastic with appropriate markings indicating amounts used and amounts available for use. In addition, other information may be conveniently printed on the hopper 16 to provide a ready reference for users. For example, the top front edge also includes a four inch rule 36 to accurately measure the diameter of a tree or other plant to assist in calculating the amount of fertilizer to be applied.

It is to be understood that the present invention is not limited to the embodiments described above, but encompasses any and all embodiments within the scope of the following claims.

What is claimed is:

1. A hand-held apparatus for dispensing fertilizer in an optimum position for maximum plant fertilization comprising:

hopper means having a front, a back, a first side and a second side, an open top end, and a closed bottom end, said sides sloping downwardly from said top end to said bottom end thereby forming a container for storing said fertilizer, a handle pivotally mounted on said open top end for carrying said apparatus, said handle containing a locking pin, a retractable leg spike slidably fastened to a first side of said hopper means for holding said hopper in a vertical position, said retractable leg spike comprising a "U" shaped hook means for engaging said locking pin in a vertical position, and holding said spike in an extended position for loading said fertilizer, or in a retracted position while dispensing said fertilizer, discharge means located in said second side near said closed bottom end for placing said fertilizer on a desired area, and spring loaded trigger means having a first and a second end, said trigger means slidably mounted on said second side, said trigger means having a finger loop at said first end and an opening plate fastened to said second end of said trigger means and slidably mounted on said second side for selectively opening and closing said discharge means for dispensing said fertilizer in appropriate portions.

2. A hand-held apparatus for dispensing fertilizer in an optimum position for maximum plant fertilization comprising:

a rectangular, extended, tapered, hopper having a front, a back, a first side and a second side, an open top end, and a closed bottom end, said sides sloping downwardly from said top end to said bottom end thereby forming a container for storing said fertilizer, a handle pivotally mounted on said open top for carrying said apparatus while in operation, said handle containing a locking pin, a retractable leg spike slidably fastened to a first side of said hopper means for holding said hopper in a vertical position, said leg spike comprising a "U" shaped hook means for engaging said locking pin in a vertical position, and for holding said spike in an extended position for loading said fertilizer, or in a retracted position while dispensing said fertilizer, a discharge opening located in said second side near said closed bottom end for placing said fertilizer on a desired area, and spring loaded trigger means having a first and a second end, said trigger means slidably mounted on said second side, said trigger means having a finger loop at said first end and an opening plate fastened to said second end of said trigger means and slidably mounted on said second side for selectively opening and closing said discharge opening for dispensing said fertilizer in appropriate portions.

* * * * *